(12) United States Patent
Meid

(10) Patent No.: US 8,508,906 B2
(45) Date of Patent: Aug. 13, 2013

(54) DEVICE AND METHOD FOR IDENTIFYING THE TYPE OF CONTROL FOR A VOLTAGE-RELEASE OR CURRENT-RELEASE SWITCHING DEVICE

(75) Inventor: Wolfgang Meid, Muelheim-Kaerlich (DE)

(73) Assignee: Eaton Industries GmbH, Bonn (DE)

( * ) Notice: Subject to any disclaimer, the term of this patent is extended or adjusted under 35 U.S.C. 154(b) by 612 days.

(21) Appl. No.: 12/602,686

(22) PCT Filed: Apr. 12, 2008

(86) PCT No.: PCT/EP2008/002908
§ 371 (c)(1),
(2), (4) Date: Jun. 7, 2010

(87) PCT Pub. No.: WO2008/148441
PCT Pub. Date: Dec. 11, 2008

(65) Prior Publication Data
US 2011/0157757 A1     Jun. 30, 2011

(30) Foreign Application Priority Data
Jun. 4, 2007   (DE) .......................... 10 2007 026 169

(51) Int. Cl.
*H01H 47/00*   (2006.01)
(52) U.S. Cl.
USPC ........................................................ 361/152
(58) Field of Classification Search
USPC ........................................................ 361/152
See application file for complete search history.

(56) References Cited

U.S. PATENT DOCUMENTS

| | | | |
|---|---|---|---|
| 5,436,785 A * | 7/1995 | Ferrazzi et al. ................. | 361/42 |
| 5,450,334 A | 9/1995 | Pulizzi et al. | |
| 5,610,579 A | 3/1997 | Early et al. | |
| 5,818,128 A | 10/1998 | Hoffman et al. | |
| 6,327,130 B1 | 12/2001 | Durif et al. | |
| 2003/0160517 A1 | 8/2003 | Lo et al. | |

FOREIGN PATENT DOCUMENTS

| | | |
|---|---|---|
| DE | 3823922 A1 | 1/1989 |
| DE | 3826284 A1 | 2/1990 |
| DE | 4017134 A1 | 12/1990 |
| DE | 4311883 A1 | 10/1994 |
| DE | 69306221 T2 | 5/1997 |
| EP | 1009005 A1 | 6/2000 |

OTHER PUBLICATIONS

International Search Report for PCT/EP2008/002908, mailed on Nov. 5, 2008.

\* cited by examiner

*Primary Examiner* — Dharti Patel
(74) *Attorney, Agent, or Firm* — Leydig, Voit & Mayer, Ltd.

(57) ABSTRACT

A device for identifying a control mode for a voltage or current release of a voltage-release or current-release switching device includes at least one control unit having first and second control inputs. The control unit includes a signal detection device configured to detect a signal state at a first control input and a blocking device configured to disable the second control input when a control signal is detected at the first control input.

17 Claims, 2 Drawing Sheets

DEVICE AND METHOD FOR IDENTIFYING THE TYPE OF CONTROL FOR A VOLTAGE-RELEASE OR CURRENT-RELEASE SWITCHING DEVICE

CROSS REFERENCE TO RELATED APPLICATIONS

This application is a U.S. National Phase application under 35 U.S.C. §371 of International Application No. PCT/EP2008/002908, filed Apr. 12, 2008, and claims benefit to German patent application DE 10 2007 026 169.3, filed Jun. 4, 2007. The International Application was published in German on Dec. 11, 2008 as WO 2008/148441 A1 under PCT Article 21 (2).

FIELD

The present invention relates to a device and method for identifying the control mode for a voltage or current release of a voltage-release or current-release switching device, including at least one control unit having at least two control inputs.

BACKGROUND

European document EP 1 009 005 B1 describes a control device of a circuit breaker opening or closing electromagnet, said device featuring local and remote control capability. The device includes two power supply terminals and a remote control terminal, as well as a local control terminal. In a first control mode, two power supply terminals are connected to a voltage supply source via a first local control means. In a second control mode, the two power supply terminals are connected directly to the voltage supply source, and the local control terminal is connected via a second local control means to one of the power supply terminals. Also provided is a communication module. Presence detection means are connected to at least one presence detection terminal and designed to automatically detect connection of the communication module to the remote control and presence detection terminals of the device. Opening and closing of the circuit breaker is controlled either by the second local control means or by a control command from the communication module. The device further includes means for comparing a quantity representative of the voltage applied to the power supply terminals with a preset threshold, means for detecting the presence of a communication module at the remote control and presence detection terminals, means for commanding excitation of at least one coil of the electromagnet when said quantity is greater than said threshold. The excitation of the coil is effected either automatically in the absence of detection of presence of a communication module, or, when said presence is detected, if a control signal is, in addition, applied to the remote control terminal or to the local control terminal. Further, a resistive voltage divider is connected to the power supply terminals for interconnection of a rectifier and a microprocessor-based circuit. The microprocessor-based circuit includes means for comparing, detecting presence and commanding. The local control terminal, which can be controlled by the local control means, is also connected to the microprocessor-based circuit. A transistor is connected to the output side of the microprocessor-based circuit as an electronic interrupter, the coil being connected to the drain side of the transistor.

Thus, according to EP 1 009 005 B1, several terminals are needed to be able to implement the different control modes for the circuit breaker. In particular, a communication module is provided here which serves to operate the device in a local mode and/or in a remote control mode. In purely local mode, in addition to the one local control means, a second local control means is provided in the region of the one power supply terminal, which makes the device quite complex in terms of design.

SUMMARY

In an embodiment, the present invention provides a device for identifying a control mode for a voltage or current release of a voltage-release or current-release switching device. The device includes at least one control unit having first and second control inputs. The control unit also includes a signal detection device configured to detect a signal state at a first control input. A blocking device is included in the control unit that is configured to disable the second control input when a control signal is detected at the first control input.

BRIEF DESCRIPTION OF THE DRAWINGS

The present invention will be further described below with reference to exemplary embodiments and the accompanying drawings, in which.

DETAILED DESCRIPTION

Figure 1:
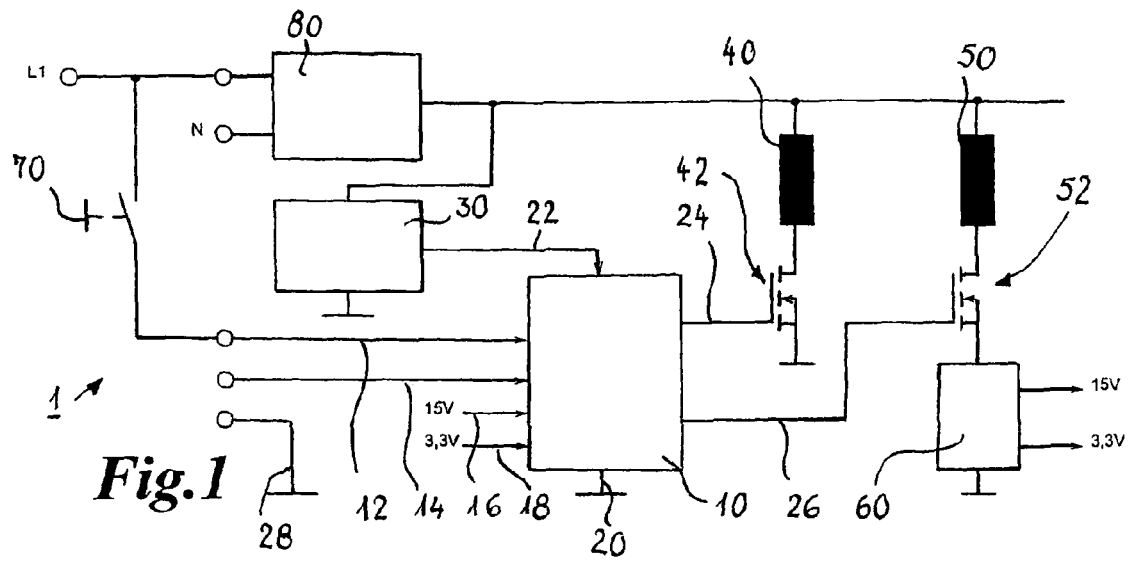
FIG. 1 is a schematic diagram of a first embodiment of a device according to the present invention for identifying the control mode for a voltage or current release of a switching device.

It is an object of the present invention to design a less complex device for identifying the control mode for a voltage or current release of a voltage-release or current-release switching device.

In a device for identifying the control mode for a voltage or current release of a voltage-release or current-release switching device, this object is achieved by providing a signal detection device for detecting the signal state at least one control input of the control unit, and a device for blocking the at least one control-signal-free control input when a control signal is present at a control input. In a method for identifying the control mode for a voltage or current release of a voltage-release or current-release switching device, this object is achieved in that the signal state at the control inputs of the control unit is detected to indicate operation of the voltage or current release, and in that, when a control signal is present at a control input, the at least one further control input is blocked.

In this manner, a device and method for identifying the control mode for a voltage or current release of a voltage-release or current-release switching device is provided in which no jumper is needed to identify the control mode for the voltage or current release, and in which, unlike in the prior art, the device for identifying the control mode is not complex in design. Thus, the complexity of the circuitry can be minimized and thus optimized. Furthermore, all control modes are available at all times, and the respective control mode is identified automatically. Unlike the prior art, no additional communication module is required for this purpose. Rather, indication of the particular control mode is accomplished in a simple manner by sampling the signal state at a control input of the control unit after the control unit of the switching device is connected to voltage. When a signal to operate the voltage or current release is present at the one control input, no further operation can be accomplished via the at least one further control input. Thus, advantageously, one of the control inputs is in communication with the voltage or current release of the switching device. Consequently, when the voltage or current release is operated, a signal is present at this control input, so that the at least one other control input is blocked. Enabling occurs only when the signal at the one control input is no longer present; i.e. when the one control input is free of signals again.

There is advantageously provided a device for enabling the at least one other control input when the signal at the one control input is no longer present. When the signal at the one control input is no longer present, the at least one further control input is enabled. In this manner, command output at this one further control input is possible again and, of course, also at the other one, which is now free of signals again. The at least one further control input can be operated, in particular, by a voltage which is different from the supply voltage and which may be 24 volts, for example. On the other hand, advantageously, the supply voltage is applied to the other control input. Advantageously, a switch element is provided by which the supply voltage can be connected to this control input.

Advantageously, the control unit includes at least one microcontroller, which provides an inexpensive, yet effective and easily programmable device.

Furthermore, it is advantageous when the one control input is connected to the control unit via an enhancement mode field effect transistor. Using an enhancement mode field effect transistor, particularly an n-channel MOSFET, it is possible to prevent drain current flow when the gate-source voltage is lower than the threshold voltage of the transistor; the control input being connected to the gate terminal of the field-effect transistor, the drain terminal being connected to the control unit, and the source terminal being connected to ground.

Advantageously, all control inputs, particularly two control inputs, are each connected to the control unit via one enhancement mode field effect transistor, particularly an enhancement-mode n-channel MOSFET. The use of the enhancement mode field effect transistors makes it possible to achieve the desired blocking and enabling of the at least one further control input when a control signal is present at the other control input.

Instead of a galvanic connection between the control input and the control unit via such an enhancement mode field effect transistor, an optical connection may alternatively be provided between the one further control input and the control unit. This allows a galvanic isolation to be provided between the control input and the control unit itself, thereby preventing the same from being damaged by overvoltages or high currents.

The use of a signal detection device allows a voltage-release or current-release switching device containing such a device for identifying the control mode to be operated as a voltage release or current release based on the signal state at one control input, or at the control inputs, of a control unit of the control mode identification device.

FIG. 1 shows a schematic diagram of a circuit configuration of a device 1 for identifying the control mode for a voltage or current release of a voltage-release or current-release switching device. The circuit includes a control unit 10 having two control inputs 12, 14. Furthermore, control unit 10 has a 15 volt terminal 16 and a 3.3 volt terminal 18. Control unit 10 is further provided with a ground terminal 20, a terminal 22 for connection to a voltage measuring device 30, and two outputs 24, 26 connecting to a pull-in coil 40 and a holding coil 50. Enhancement mode field effect transistors 42, 52 are connected in series with and upstream of the two coils 40, 50, respectively, said field-effect transistors being in the form of n-channel MOSFETs here.

Device 1 further includes a power supply unit 60, which is connected to the source of enhancement mode field effect transistor 52, which is connected in series with and upstream of holding coil 50. Enhancement mode field effect transistor 52 has its gate to control unit 10 and its drain connected to holding coil 50. Power supply unit 60 provides 15 volts as well as 3.3 volts.

Control input 12 is connected to supply voltage line L1 via a switch 70. A filter and rectifier device 80 provides a filtered and rectified supply voltage for the connection of pull-in coil 40 and holding coil 50 and voltage measuring device 30.

Moreover, a ground terminal 28 is provided for second control input 14.

Supply voltage can be applied to control input 12 by operating switch 70, whereas control input 14 is operated by a voltage different from the supply voltage. For example, a voltage of 24 volts may be applied here.

Control unit 10 identifies the particular control mode for the voltage release or current release based on the signal state at control input 12. Upon operating switch 70; i.e., when voltage is connected to control input 12, control unit 10 detects the signal at control input 12 and deduces the control mode (voltage or current release operation). As soon as a signal is present at control input 12, operation via control input 14 is blocked, so that the latter is no longer able to transmit a control signal to control unit 10. Once the control signal is no longer present at control input 12, control input 14 is enabled for command output again. If no signal is present at control input 12, command output at control input 12 or 14 is possible until a signal is detected at one of the two control inputs 12, 14. Control unit 10 is configured such that each time a signal is detected at one of the two control inputs 12, 14, the other input will be blocked for as long as the control input to which the signal is applied is operated. However, in this process, when the voltage is connected to the system by operating switch 70, control input 12 indicates to control unit 10 the particular control mode for the voltage or current release. Thus, the control mode is identified automatically, and all control modes are available at all times.

Figure 2:
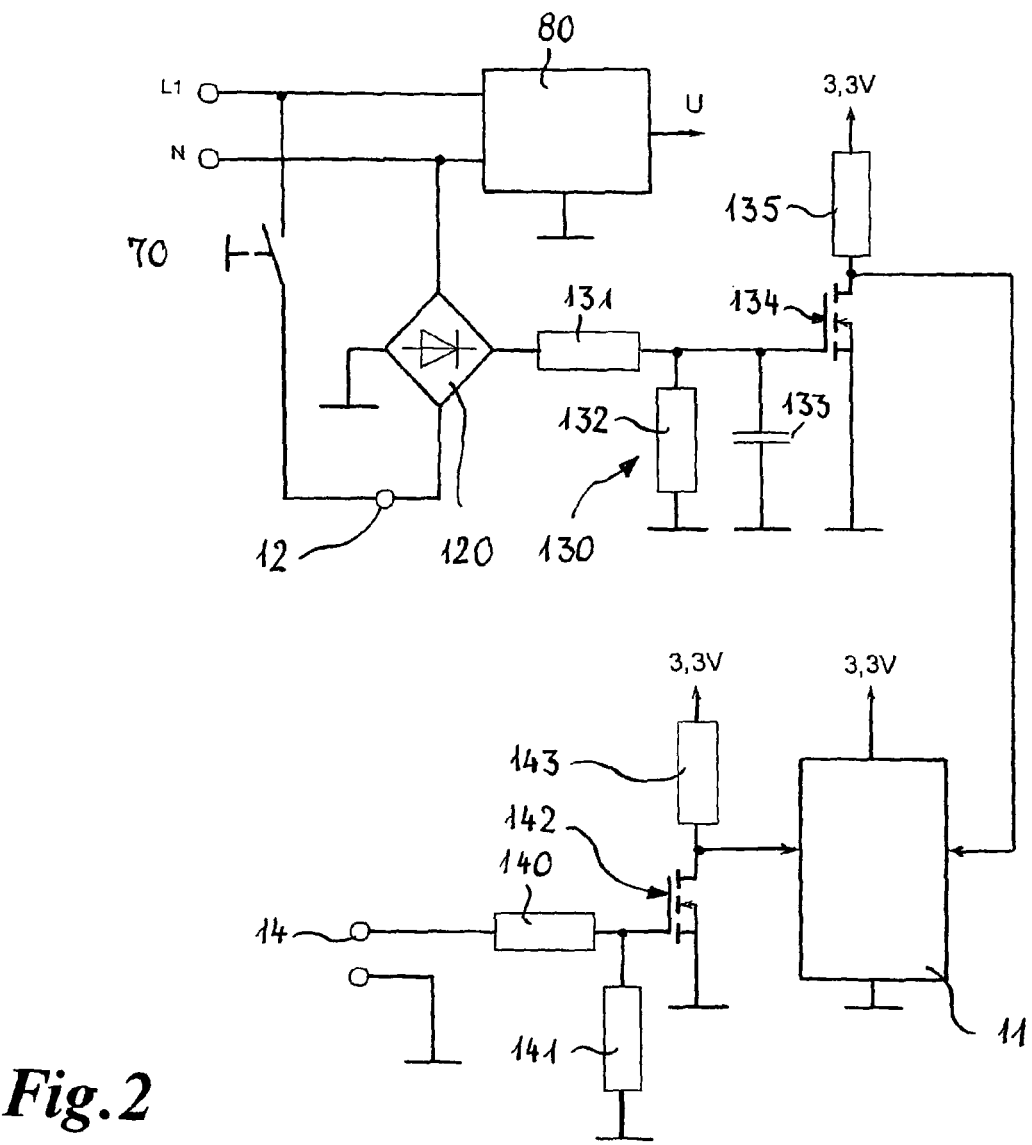
FIG. 2 is a schematic diagram of a second embodiment of a device for identifying the control mode for a voltage or current release of a switching device.

FIG. 2 shows a detailed circuit configuration for the two control inputs 12 and 14 and control unit 10. In this specific embodiment, control unit 10 includes a microcontroller 11. Interposed between control input 12 and the microcontroller are a rectifier circuit 120 for rectifying the signal at control input 12 and an RC element 130 including two resistors 131, 132 and a capacitor 133. In this manner, provision is made for a voltage divider and/or a filtering means. Alternatively, an optocoupler could be provided here.

Also provided is an enhancement mode field effect transistor (n-channel MOSFET) 134, whose gate is connected to RC element 130. Field-effect transistor 134 has its source connected to ground, while on its drain side, provision is made for a further resistor 135, which in turn is connected to 3.3. volts, and for a connection to microcontroller 11.

Second control input 14 is connected via resistors 140, 141 to the gate of an enhancement mode field effect transistor (n-channel MOSFET) 142. Enhancement mode field effect transistor 142 has its source connected to ground and its drain connected via a resistor 143 to 3.3V, the drain also being connected to microcontroller 11.

In particular, the provision of enhancement mode field effect transistors 134 and 142 makes it possible to enable and block one control input 12 or 14, when a signal is present at the respective other control input 12 or 14. In this connection, both field-effect transistors are in common-source mode. The field-effect transistors are used for signal conditioning purposes.

Figure 3:
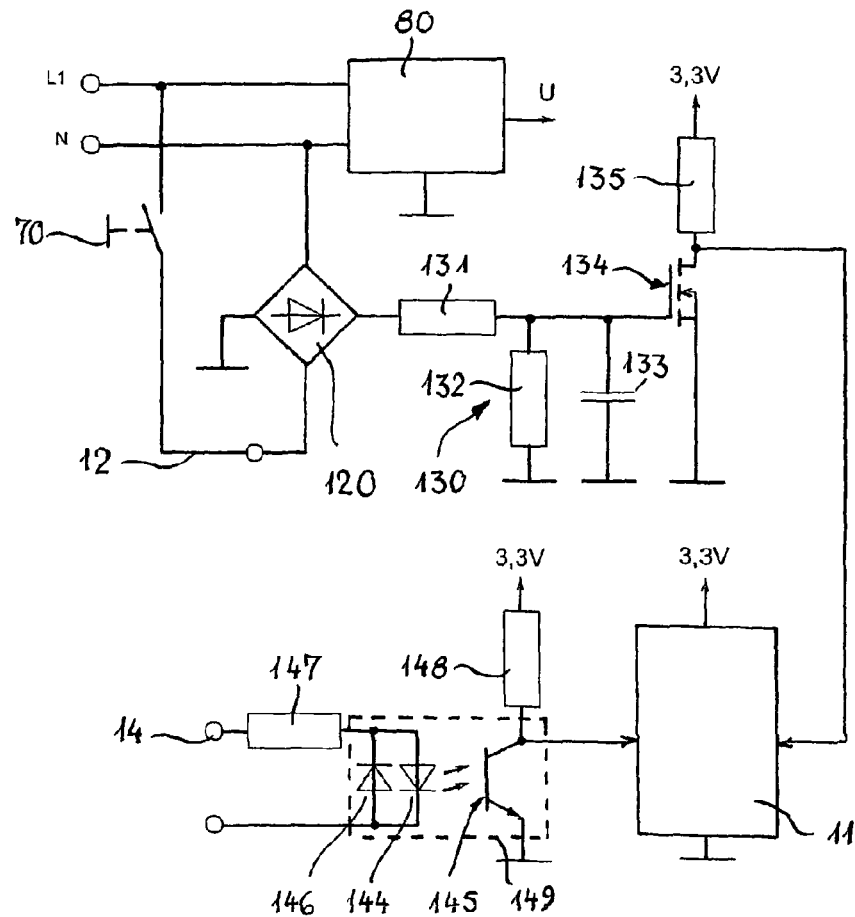
FIG. 3 is a schematic diagram of a third embodiment of a device for identifying the control mode for a voltage or current release of a switching device.

An alternative design approach for the portion of the device that includes control inputs 12, 14 and control unit 10 is shown in FIG. 3. Here, the design of first control input 12 corresponds to the embodiment shown in FIG. 2. As for control input 14, an optical connection via an optocoupler 149 is provided in place of the galvanic connection between control input 14 and control unit 10; i.e., microcontroller 11, said optocoupler including a photodiode 144 as a transmitter and a corresponding phototransistor 145 as a receiver. Photodiode 144 is connected in parallel with a second diode 146. Further, a resistor 147 is connected in series with and upstream of these two diodes. Phototransistor 145, or rather, the photo-duo-diode, since the base of the phototransistor is not brought out, is used as a photoreceiver. The phototransistor has its collector connected to 3.3 V via a resistor 148, and to microcontroller 11. The emitter of phototransistor 145 is connected to ground. The optical connection makes it possible for a galvanic isolation to occur between control unit 14 and the control unit; i.e., the microcontroller, when the same should be avoided, for example, due to safety considerations. Since it is only detected whether a signal is present at control input 14, there is no need to apply a higher voltage here, and therefore, it is sufficient to sample a signal via an optical connection.

In addition to the embodiments of devices for identifying the control mode for a voltage or current release of a voltage-release or current-release switching device, which are described above and shown in the drawings, many other may be provided, each having a signal detection device for detecting the signal state at least one control input, and a device for blocking the at least one further control input when a signal is present at the first control input. In any case, the connection between the control inputs and the control unit may be achieved by galvanic coupling or non-galvanic coupling, since it is only detected whether signals are applied at the control inputs.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS

1 device for identifying the control mode
10 control unit
11 microcontroller
12 first control input
14 second control input
16 15V terminal
18 3.3V terminal
20 ground terminal
22 terminal
24 output
26 output
28 ground terminal
30 voltage measuring device
40 pull-in coil
42 FET
50 holding coil
52 FET
60 power supply unit
70 switch
80 filter and rectifier device
120 rectifier circuit
130 RC element
131 resistor
132 resistor
133 capacitor
134 FET
135 resistor
140 resistor
141 resistor
142 FET
143 resistor
144 photodiode
145 phototransistor
146 diode
147 resistor
148 resistor
149 optocoupler
L1 supply voltage line

What is claimed is:

1. A device for identifying a control mode for a voltage or current release of a voltage-release or current-release switching device, comprising:
at least one control unit having first and second control inputs, the at least one control unit including a signal detection device configured to detect a signal state at the first control input, and
a blocking device configured to disable the second control input when a control signal is detected at the first control input.

2. The device as recited in claim 1, wherein the first control input is in communication with the voltage or current release of the switching device.

3. The device as recited in claim 1, wherein the control unit further comprises an enabling device configured to enable the second control input when the control signal is no longer detected at the first control input.

4. The device as recited in claim 1, wherein the control unit includes at least one microcontroller.

5. The device as recited in claim 1, wherein the first control input is connected to the control unit via an enhancement mode field effect transistor.

6. The device as recited in claim 1, wherein each of the first and second control inputs is connected to the control unit via a respective enhancement mode field effect transistor.

7. The device as recited in claim 1, wherein the first control input is connected to the control unit via a galvanic connection.

8. The device as recited in claim 1, wherein the first control input is connected to the control unit via an optical connection.

9. The device as recited in claim 1, wherein the first control input is configured to accept a first control voltage and the second control input is configured to accept a second voltage, the second voltage being different from the first voltage.

10. The device as recited in claim 1, wherein the signal detection device is configured to determine whether the switching device operates in a voltage release mode or a current release mode based on a signal state at least one of the first and second control inputs.

11. A method for identifying a control mode for a voltage or current release of a voltage-release or current-release switching device including a control unit having a plurality of control inputs, comprising:
    detecting, by the control unit, a signal state at a first control input of the plurality of control inputs; and
    disabling, by the control unit, a second control input of the plurality of control inputs when a control signal is detected at the first control input.

12. The method as recited in claim 11, further comprising connecting, before the detecting, a voltage source to the first control input.

13. The method as recited in claim 11, further comprising enabling the second control input when the control signal is no longer detected at the first control input.

14. The method as recited in claim 11, further comprising transmitting the control signal from the first control input to the control wilt via a galvanic connection.

15. The method as recited in claim 11, further comprising transmitting the control signal from the first control input to the control unit via an optical connection.

16. A device for identifying a control mode for a voltage or current release of a voltage-release or current-release switching device, comprising:
    at least one control unit having first and second control inputs, the at least one control unit including a signal detection device configured to detect a signal state at the first control input, and a blocking device configured to disable the second control input when a control signal is detected at the first control input;
    wherein the first control input is connected to the control unit via a galvanic connection or an optical connection.

17. A method for identifying a control mode for a voltage or current release of a voltage-release or current-release switching device including a control unit having a plurality of control inputs, comprising:
    detecting, by the control unit, a signal state at a first control input of the plurality of control inputs;
    disabling, by the control unit, a second control input of the plurality of control inputs when a control signal is detected at the first control input; and
    transmitting the control signal from the first control input the control unit via a galvanic connection or an optical connection.

* * * * *